April 7, 1931.    G. D. BISHOP    1,799,497
FRUIT GUARD
Filed May 28, 1930
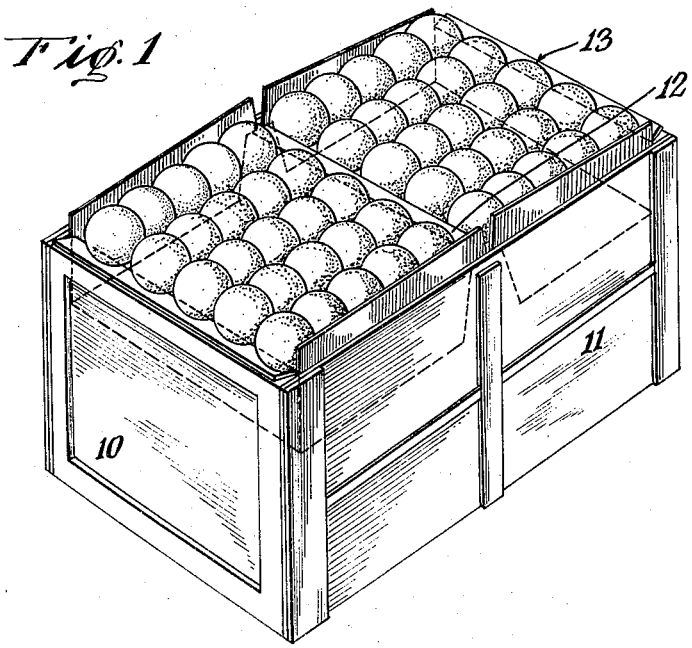
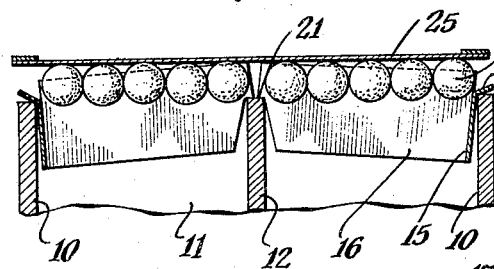
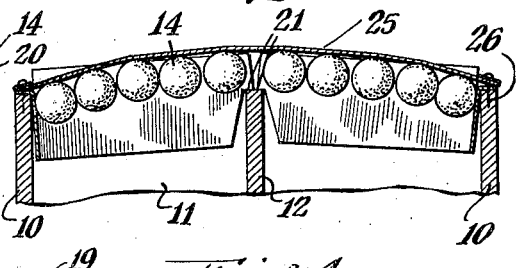
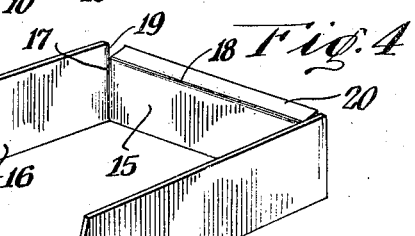
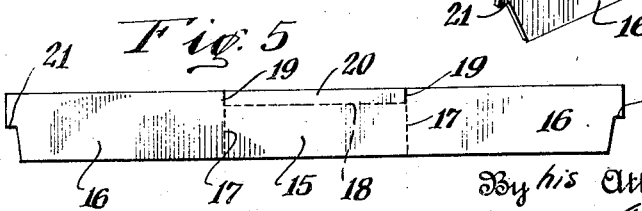
Inventor
George D. Bishop
By his Attorney
Albert W. Austin Patented Apr. 7, 1931

1,799,497

UNITED STATES PATENT OFFICE

GEORGE D. BISHOP, OF SANFORD, FLORIDA, ASSIGNOR TO CROWN PAPER COMPANY, OF SANFORD, FLORIDA, A CORPORATION OF DELAWARE

FRUIT GUARD

Application filed May 28, 1930. Serial No. 456,381.

This invention relates to the packing of fruits and similar articles, and more particularly to a fruit guard for use in packing citrus fruits and preventing injury to the skin of the fruits which would otherwise be caused by the pressure exerted in packing. The guard also shields the top layer of fruit in a packing crate and prevents injury thereto during transit.

In boxing citrus fruits, such as oranges and lemons, the top layer is commonly allowed to extend a substantial distance above the sides of the crate. When the top is applied to the crate a sufficient pressure is exerted thereto to force the ends of the top down against the ends of the crate thereby causing the fruit in the top layer to move downwardly and causing the fruit adjacent the ends of the crate to slide against the inside of the crate. This frequency results in bruising the skin of the fruit which causes rapid decomposition of the top layer.

In accordance with the present invention a fruit guard is inserted in the crate between the sides of the crate and the top layer of fruit. This guard is so constructed that it remains stationary when the cover is applied and prevents the fruit from coming in contact with the sides of the crate itself. The guard is also designed to project above the sides of the crate a sufficient distance to shield the fruit, particularly at the center of the crate where there is a substantial space between the side and top.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, the mode of its operation and the manner of its organization may be better understood by referring to the following description taken in connection with the accompanying drawings forming a part thereof, in which Fig. 1 is a perspective view of a crate of fruit showing the guard applied thereto;

Fig. 2 is a longitudinal section of the crate showing the cover applied before it is clamped in place;

Fig. 3 is a sectional view showing the cover permanently nailed in place;

Fig. 4 is a perspective view of the fruit guard; and

Fig. 5 is a plan view of the blank from which the guard is formed.

Like reference characters denote like parts in the several figures of the drawings.

In the following description and in the claims parts will be identified by specific names for convenience, but they are intended to be as generic in their application to similar parts as the art will permit.

Referring to the drawings more in detail the invention is shown as applied to a fruit crate comprising ends 10, sides 11 and a center wall 12. The fruit 13 is packed in said crate so that the top layer of fruit 14 extends a substantial distance above the sides and ends thereof.

For protecting this top layer a fruit guard comprising end 15 and sides 16 is formed of comparatively stiff flexible material, such as cardboard, or other composition board. The board is provided with scores 17 and 18 to facilitate bending and is cut at 19 to provide an end flap 20. The ends of said member 16 are notched and provided with shoulders 21 which are adapted to rest upon the center wall 12 of the crate.

For mounting the guard in the crate, the side walls 16 are bent about scores 17 and flap 20 is bent downwardly about scores 18. The guard is then inserted in such manner that the flap 20 rests upon end 10 and side members 16 extend adjacent the side walls of the crate with shoulders 21 resting upon center wall 12. The guard is thus held in a fixed position and is prevented by flap 20 and shoulders 21 from moving relative to the crate when the cover is applied. It is obvious that the guard may be applied either before or after the top layer of fruit is inserted in the crate. It is preferable, however, to apply the guard before the top layer of fruit is inserted in the crate inasmuch as the packing operation is thus facilitated.

After the guard has been inserted and the crate packed, as shown in Fig. 2, cover 25 is positioned thereon in contact with the top layer of fruit. Sufficient pressure is then applied to the ends of cover 25 to force the same into engagement with ends 10 of the crate. At the same time the layers of fruit are compressed and the fruit adjacent the end walls is caused to slide downwardly into the crate. The guard, however, prevents abrasion of the skin of the fruit during this operation, thereby eliminating possibility of injury which might otherwise be caused by the fruit coming in contact with the wall of the crate itself.

In making the so-called "bulge pack", the cover is allowed to bend, as shown in Fig. 3, thereby permitting the center portion of the fruit to extend above the side walls 11 of the crate. This provides a considerable gap between the side walls and the cover which is covered by the side members of the guard. The guard is accordingly formed sufficiently high above shoulder 21 to cover the normal space which occurs in the crate, thereby shielding the fruit from outside injury. The shoulders 21 and flaps 20 prevent the guard from being forced downwardly as the cover is applied and thereby insures the correct positioning thereof in the final crate. Flap 20 is clamped between the ends of cover 25 and the end wall 10 of the crate and the members are permanently held in this position by suitable nails 26.

It is to be noted that the above described guard prevents the outer rows of the top layer of fruit from being bruised or damaged in any manner by the force exerted in applying the cover and protects the exposed portions of the fruit from injury during transit.

While certain novel features of the invention have been shown and described and are pointed out in the annexed claims, it will be understood that various omissions, substitutions and changes in the forms and details of the device illustrated and in its operation may be made by those skilled in the art without departing from the spirit of the invention.

The invention has been described as applied to a fruit guard. It is to be understood, however, that it is also useful in packing other materials such as vegetables. The term fruit was used for convenience of description only and not as a limitation.

What is claimed is:

1. A fruit guard comprising a flexible board bent to engage the sides and ends of a fruit box, the end section of said board having a top flange formed thereon and bent at right angles thereto for engagement with the top of the box end, the side members of said guard having shoulders formed thereon and adapted to engage the mid wall of a box.

2. A blank for a fruit guard comprising a flexible board provided with scores, dividing said board into a center section and wing sections, a cross score joining said first mentioned scores, cuts extending from the end of said cross score to the edge of said board and notches formed in the ends of said wing sections to provide shoulders a substantial distance from the edge of said board.

3. A fruit package comprising a box having side and end walls and a central partition, a flexible cover adapted to be secured to the ends of said box and to extend a substantial distance above said mid wall, a fruit guard comprising a flexible board mounted in said package adjacent the side and end walls thereof, said guard having an end flap, means for clamping said end flap between said end walls and said cover, said guard having shoulders resting on said mid wall for preventing movement of said guard during packing, said guard extending above the side walls for closing the gap between said side walls and said cover.

4. A fruit container comprising a box having side and end walls and a center transverse wall, and a fruit guard mounted in said box comprising a flexible board bent to form wing and end members, said wing members extending adjacent the side walls of said box and having shoulders formed thereon in engagement with said center wall to limit the downward movement of said guard during packing.

5. A fruit container comprising a box having side and end walls and a transverse center wall and a guard mounted within said container adjacent the top row of fruit, said guard being formed of flexible board and extending substantially around the entire box, and means for limiting the downward movement of said guard when the cover is applied to said box comprising shoulders formed on said guard in engagement with said center wall.

6. A fruit package comprising a box having side and end walls and a transverse center wall and a pair of U-shaped fruit guards positioned in said box between said box and the top layer of fruit, the center portion of said guards being in contact with the ends of said box and the ends of said guards having shoulders in engagement with said center wall, said guard extending above the sides of said box a distance at least as great as the top layer of fruit.

7. A fruit package comprising a box having side and end walls and a transverse center wall and a pair of U-shaped fruit guards positioned in said box between said box and the top layer of fruit, the center portion of said guards being in contact with the ends of said box and the ends of said guards having shoulders in engagement with said center wall, said guards extending above the sides of said box a distance at least as great as the top layer of fruit, and end flaps formed on said members, said end flaps being clamped between the end walls of said box and the cover.

In testimony whereof I have hereunto set my hand.

GEORGE D. BISHOP.